(No Model.) 2 Sheets—Sheet 2.

F. T. MUELLER.
SEPARATOR.

No. 425,448. Patented Apr. 15, 1890.

WITNESSES:
C. W. Benjamin
C. S. Scanlan

INVENTOR
Frederick T. Mueller
BY
W. F. Hapgood.
ATTORNEY

UNITED STATES PATENT OFFICE.

FREDERICK T. MUELLER, OF NEW YORK, N. Y.

SEPARATOR.

SPECIFICATION forming part of Letters Patent No. 425,448, dated April 15, 1890.

Application filed October 15, 1889. Serial No. 327,087. (No model.)

*To all whom it may concern:*

Be it known that I, FREDERICK T. MUELLER, a citizen of the United States, residing at New York, in the county and State of New York, have invented certain new and useful Improvements in Oil or Grease Separators, of which the following is a specification.

My invention consists of a device to be interposed in a line of steam-pipe at any suitable point to remove from the steam passing through the same any oil or grease that may have become mixed with it in an engine or other machinery.

Figure 1:
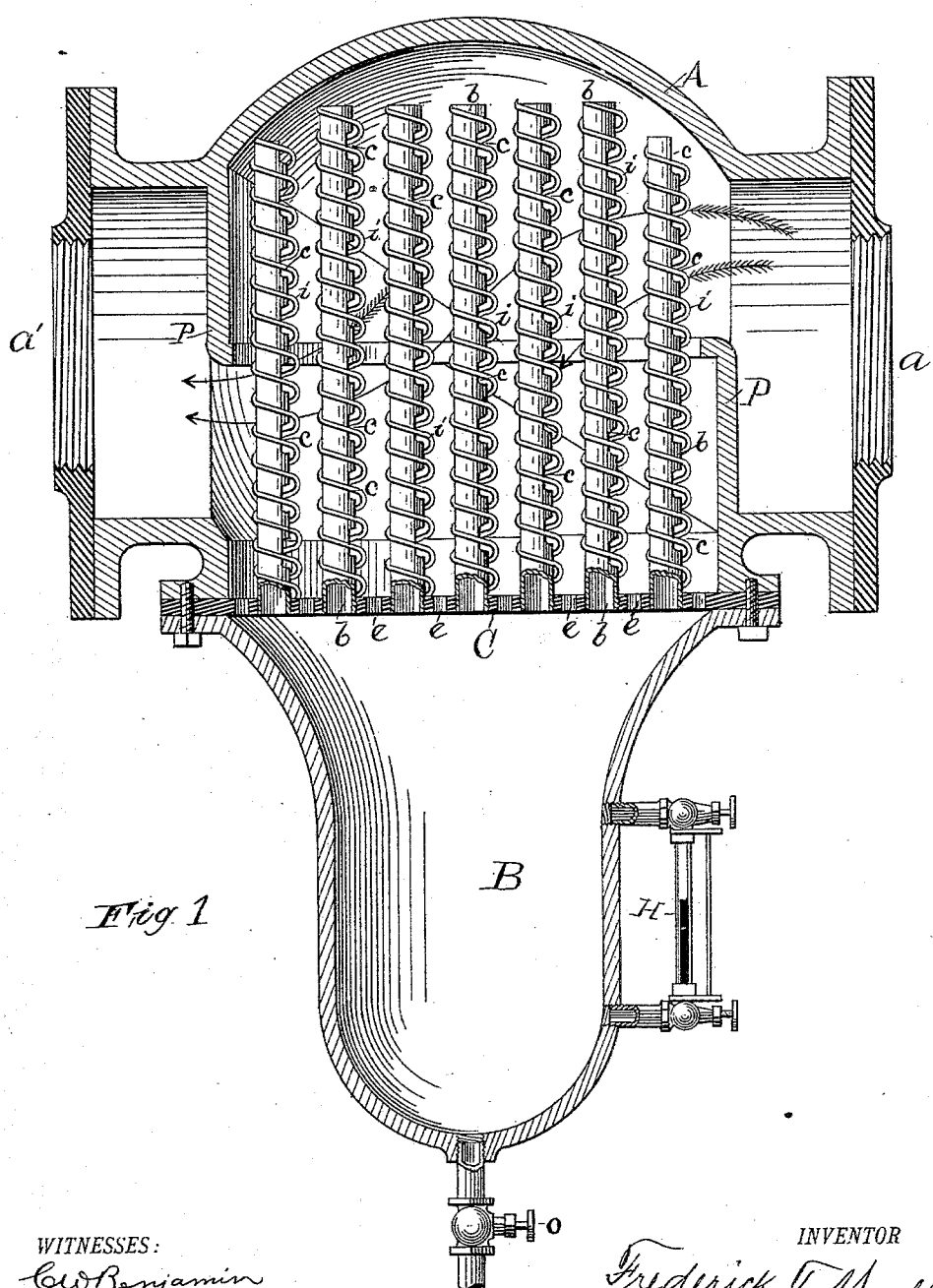
Figure 2:
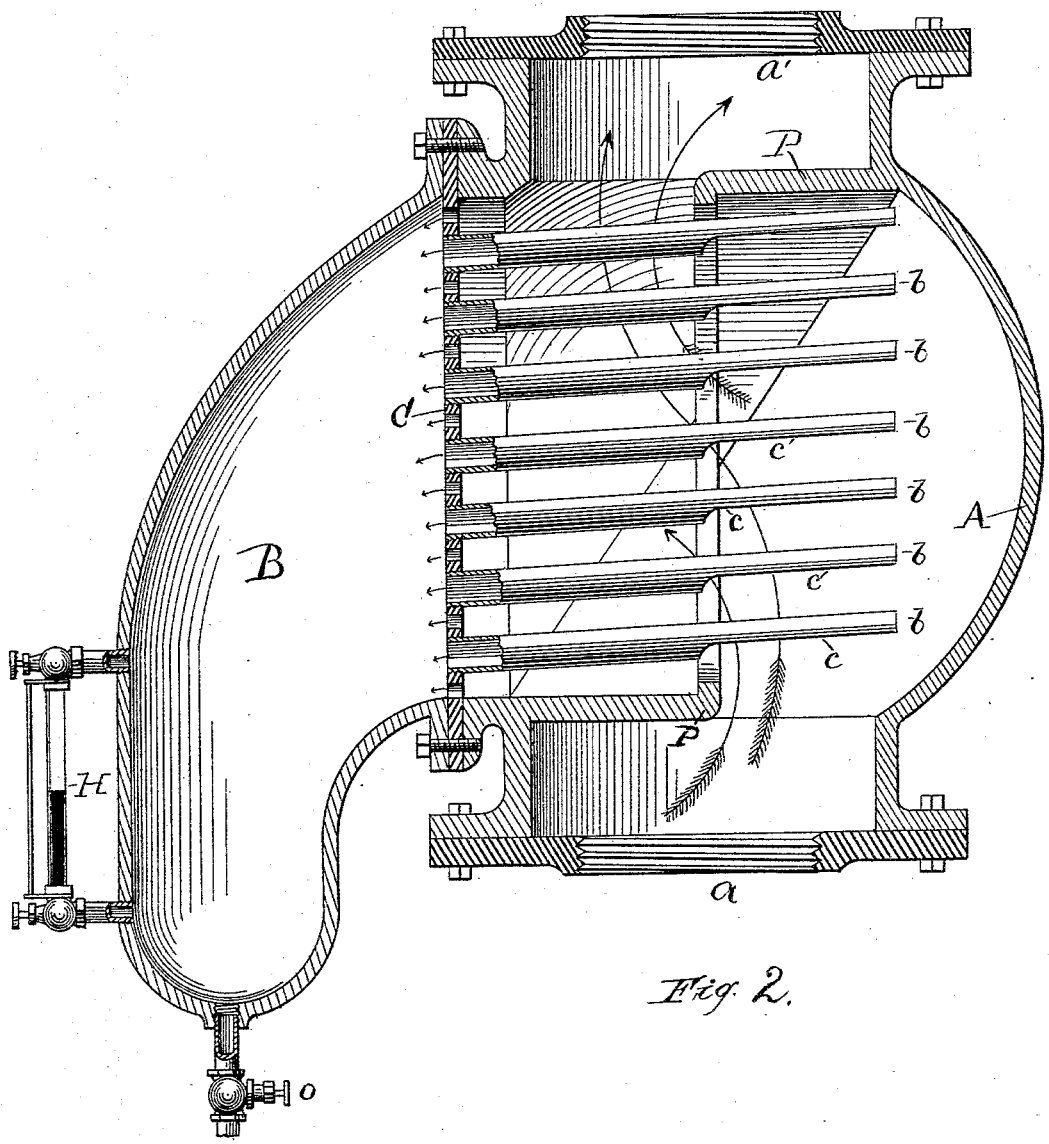

In the drawings, Figure 1 is a longitudinal section of the device as arranged for use on a horizontal line of pipe, and Fig. 2 is a similar section as adapted to a vertical pipe.

A casing A, similar to a valve-casing, is constructed with openings $a$ $a'$, where the steam-pipe is screwed on, and at the lower side of A is placed a reservoir B to receive the oil and grease that is separated from the steam passing through the separator. A partition C is interposed between the main casing A and the reservoir B, into which are fitted a number of small tubes $b$ $b$, open at both ends, and which have one or more openings $c$ $c$ cut in them on the side against which the steam strikes in its passage through the separator. Holes $e$ $e$ are drilled through the partition C, through which any oil or grease collecting upon the partition finds its way into the reservoir B. To increase the surface against which the steam must strike in passing through the separator spiral coils of wire $i$ $i$ may be placed around the tubes $b$, and for the same purpose a partition P is arranged within the case A to deflect the steam from a straight course, as indicated by the arrows.

In case the separator is to be used in a vertical line of pipe the same construction may be used, except that here I prefer to incline the tubes $b$ $b$ somewhat toward the partition C, which is here placed at the side of the main case A, to facilitate the flow of the oil collected in and upon them to the reservoir B. The reservoir B is in this form of separator curved downward to retain the oil collected.

A gage-glass H may be attached to the reservoir B to show the amount of oil and water contained; also a valve $o$ for drawing off the collected oil, &c.

The action of my improved separator is as follows: The steam carrying oil or grease in suspension enters at $a$, and striking the tubes $b$ $b$ is thoroughly divided, every portion of it coming into more or less intimate contact with the tubes $b$ $b$. The oil or grease adheres to the tubes, and gradually works down into the reservoir B through the tubes or the holes $e$ $e$. I have found that the pockets formed by cutting away portions of the sides of the tubes $b$ $b$, as shown at $c$ $c$, are very effective in catching and retaining the oils and grease, while the spiral coils $i$ $i$ greatly increase the collecting-surface and assist in retaining the oil and directing it to the reservoir.

In Fig. 1 have shown the tubes $b$ $b$ with a number of openings $c$, while in Fig. 2 there is but one long opening. Either system of cutting the tubes is, however, equally effective.

What I claim, and desire to secure by Letters Patent, is—

1. In an oil or grease separator, the combination of a suitable casing A, provided with openings $a$ $a'$ for connecting with the steam-pipe, the reservoir B, and perforated partition C, separating said casing from the reservoir, with tubes $b$ $b$ fixed in said partition, and having one or more openings $c$ $c$ in their sides, substantially as described.

2. In an oil or grease separator, the combination of the casing A, provided with steam-connections $a$ $a'$, reservoir B, and perforated partition C, with the tubes $b$ $b$ fixed in said partition and having openings $c$ cut in their sides, and the spiral coils of wire $i$ $i$, surrounding said tubes, substantially as set forth.

3. In an oil or grease separator, the combination of the casing A, having a deflecting-partition P arranged within it, the reservoir B, attached to A and separated from it by the perforated partition C, with the tubes $b$ $b$ fixed in said partition, said tubes being open at both ends and having one or more openings $c$ cut in their sides, and the spiral coils of wire $i$ $i$, placed around the tubes, substantially as and for the purpose set forth.

FREDERICK T. MUELLER.

Witnesses:
LAWRENCE KESSLER,
ANDREW MCNEILL.